(12) United States Patent
Kramer et al.

(10) Patent No.: US 7,822,876 B1
(45) Date of Patent: Oct. 26, 2010

(54) TIME BASED CONTENT MANAGEMENT FOR DISCONNECTED DEVICES

(75) Inventors: Joshua N. Kramer, Seattle, WA (US); Ameesh Paleja, Lynwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 276 days.

(21) Appl. No.: 12/165,536

(22) Filed: Jun. 30, 2008

(51) Int. Cl.
*G06F 15/16* (2006.01)
(52) U.S. Cl. ...................... 709/248; 709/217
(58) Field of Classification Search ............... 709/248, 709/217
See application file for complete search history.

(56) References Cited

U.S. PATENT DOCUMENTS 5,715,403 A * 2/1998 Stefik ........................... 705/44
7,685,318 B2 * 3/2010 Nagashima ................. 709/248
2007/0198706 A1 * 8/2007 Mechelli et al. ............. 709/224

* cited by examiner

*Primary Examiner*—Kenny S Lin
(74) *Attorney, Agent, or Firm*—Knobbe Martens Olson & Bear, LLP

(57) ABSTRACT

Systems and methods for time based management of digital content used with electronic devices lacking a connection to a common reference time keeping device are provided. Timing calibrations are used that, when applied to times measured by such disconnected electronic devices, allow the devices to calculate modified time measurements that are approximately equal to that of the reference time keeping device. The calibration time and other calibration information for the disconnected electronic devices may be stored by a digital content service and conveyed with digital content transferred from the digital content service to the disconnected electronic devices via portable data storage devices. In this manner, digital content may be consumed by a user on a plurality of disconnected electronic devices without violating license agreements associated with the digital content.

26 Claims, 11 Drawing Sheets

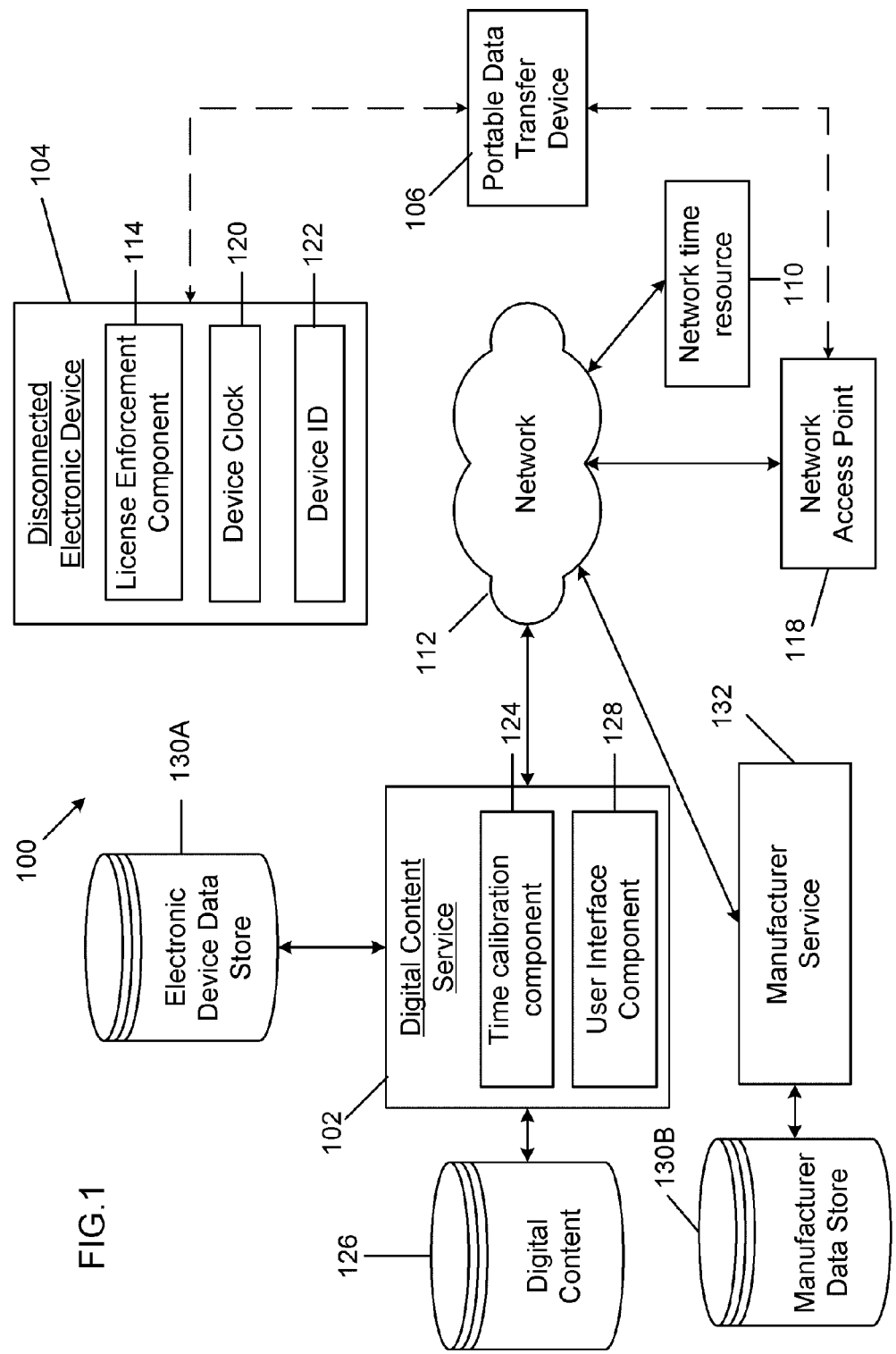

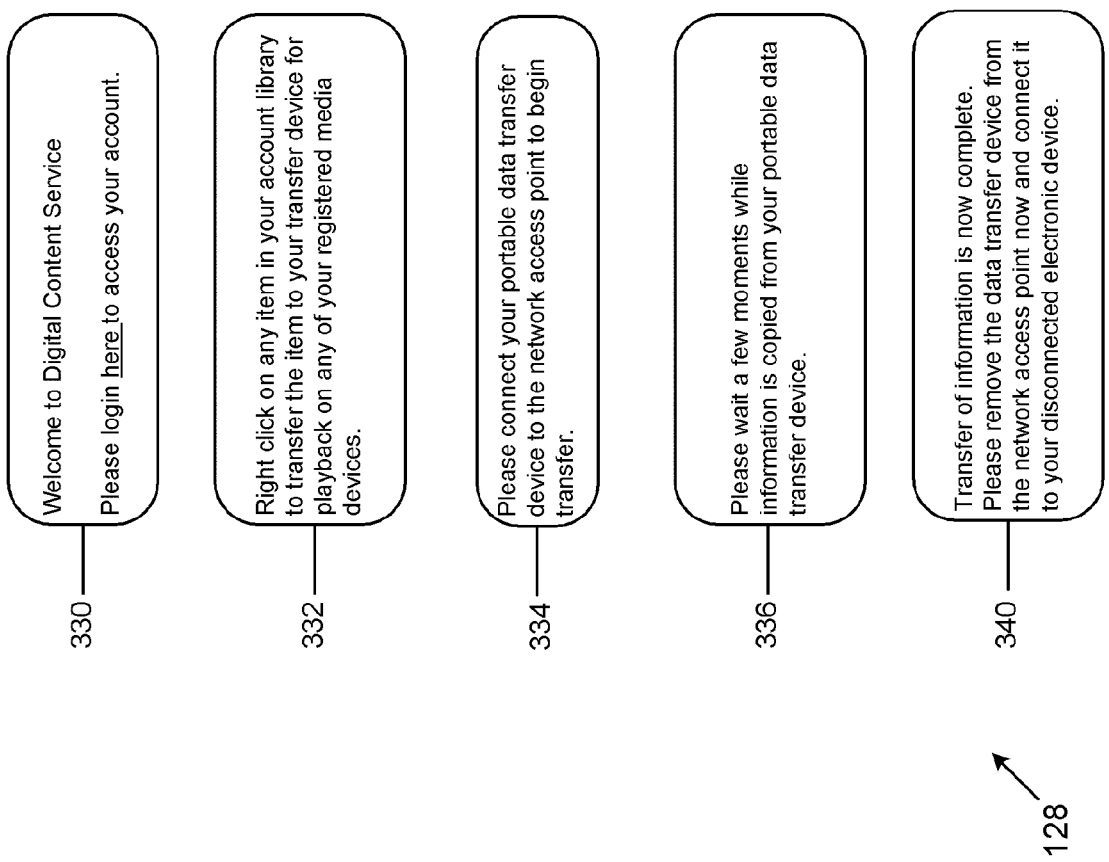

TIME BASED CONTENT MANAGEMENT FOR DISCONNECTED DEVICES

BACKGROUND

The delivery of media content through data networks has become increasingly popular in recent years. Advances in technology allow for large catalogs of media content to be viewed for selection by a user and delivered, on an ad-hoc basis, without requiring the user to wait or travel to obtain their selection.

A concern with electronic delivery of media content, however, is the enforcement of access restrictions stipulated by license agreements associated with the media content, such as time based access restrictions. To address these issues, technologies have been developed for enforcing access restrictions on playback devices having persistent or intermittent contact with a data network. For example, the time maintained by an internal clock of the playback device may be synchronized with a clock maintained by the network in order to allow the playback device to correctly measure time and to enforce access restrictions based upon such time measurements.

One problem, among others, with these approaches is their lack of applicability to disconnected electronic devices that do not possess persistent or intermittent contact with the reference time keeping device. In one aspect, disconnected devices are unable to enforce time based access restrictions under circumstances where a time based licensing restriction is measured with respect to a clock that is different than that of the disconnected devices. In a further aspect, disconnected devices are subject to timing errors due to clock drift, power outages, and user manipulation.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a block diagram of an illustrative operating environment for enforcing time based access restrictions on digital content that is used on electronic devices lacking an intermittent or persistent connection to a reference time keeping device;

FIGS. 3A through 3C are pictorial diagrams of illustrative user interfaces generated by the digital content service for assisting a user during setup and digital content transfer procedures;

DETAILED DESCRIPTION

Figure 2A:
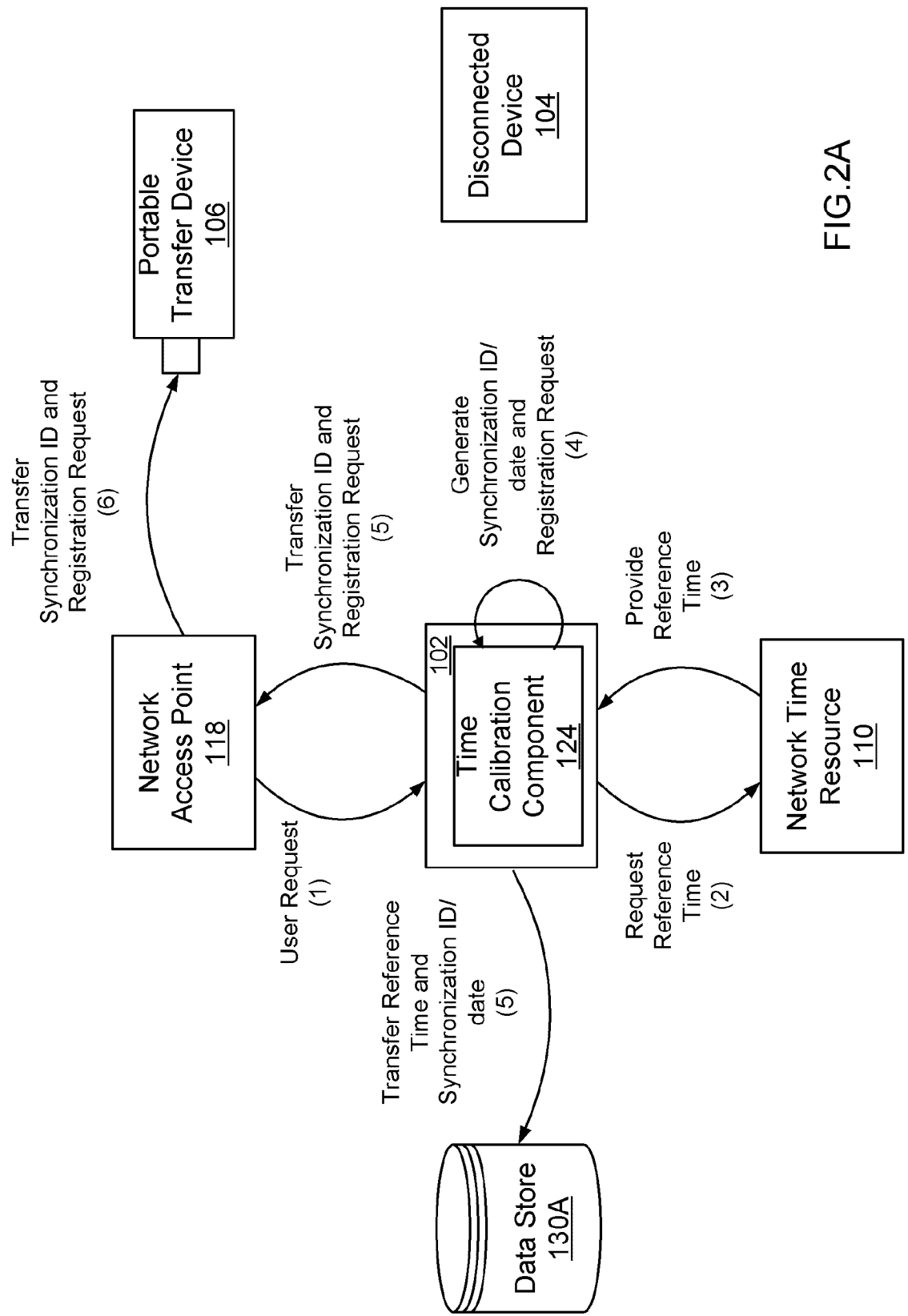
FIGS. 2A through 2E are block diagrams of illustrative operation of a digital content service and a disconnected electronic device during a time calibration process performed within the operating environment of FIG. 1.

Systems and methods for enforcing time based access restrictions associated with digital content used with electronic devices lacking a connection to a reference time keeping device are provided. As discussed herein, such electronic devices may be interchangeably referred to as "disconnected electronic devices" or simply "disconnected devices." A calibration process is developed for disconnected electronic devices that employs a digital content service in communication with the reference time keeping device. The calibration process allows the calculation of time calibration values that, when applied to a time measured by disconnected electronic devices, yields a modified time that is approximately equal to that measured by the reference time keeping device. Thus, use of the time calibration values substantially synchronizes the disconnected devices and the reference time keeping device.

Time calibration values and other calibration information for one or more disconnected electronic devices may be stored by the digital content service. When a user requests digital content from the digital content service, the service identifies the disconnected devices associated with the user and provides the calibration time values and other calibration information for the user's disconnected devices. The provided calibration values and other information may be transferred to a portable data transfer device for delivery to the disconnected devices. In this manner, digital content may be consumed by a user on a plurality of disconnected electronic devices without violating license agreements associated with the digital content.

Embodiments of the portable data transfer device may include dumb or passive data transfer devices. Examples of passive data transfer devices may include, but are not limited to, flash memory devices and rewritable optical and magnetic media. These portable data transfer devices may lack their own time keeping device and/or internal power source. These portable data transfer devices may also lack the ability to perform substantive processing operations by themselves. Compatibility with such dumb or passive data transfer devices allows the systems and methods disclosed herein to be used with the large base of portable data transfer devices available for consumer use.

FIG. 1 depicts an embodiment of an operating environment 100 including a digital content service 102 and license enforcement component 114 for use in the implementation of time based access restrictions of digital content. The digital content service 102 and the license enforcement component 114 are configured to perform a time calibration process for one or more disconnected electronic devices 104 that lack the ability to communicate with a selected reference time keeping device. The time calibration process generates a time calibration value for the disconnected electronic device 104 that, when combined with a device time measured by the same electronic device 104, yields a modified device time that approximates the time measured by the reference time keeping device.

In further embodiments, the digital content service 102 may provide digital content 126 having time based access restrictions for use with the calibrated electronic device 104. These access restrictions are enforceable by the license enforcement component 114 of the electronic devices 104 and may include restrictions such as fixed calendar dates or time windows that are measured with respect to the time at which an action is taken by a user of the electronic device 104, such as the time when the digital content is first accessed. Upon an attempt to access the digital content with a disconnected device 104, the license enforcement component 114 is configured to identify the access restrictions associated with the digital content, modify the measured device time according to the time calibration value received for the disconnected device 104, and permit or deny access to the digital content based upon whether the time based restrictions are satisfied.

As illustrated in FIG. 1, disconnected device 104 may include one or more hardware or software components capable of receiving digital content and outputting the digital content 126 in a format perceivable by a user of the disconnected devices 104. Such output of digital content, as discussed herein, may also be interchangeably referred to as access, use, consumption, and/or playback of digital content. The disconnected electronic device 104 may include, but are not limited to, personal computers, mobile phones, terminals, electronic book readers, laptop computers, digital media players, set top boxes, video game players, and personal digital assistants. Further examples of the disconnected electronic device 104 may include, but are not limited to, CD and DVD players, digital audio players (e.g., MP3 players), digital video players, and the like. The disconnected devices may further include the license enforcement component 114, a device clock 120, and a device ID 122.

The device clock 120 is a time keeping device that is internal to the disconnected device 104. In certain embodiments, the device clock 120 may be different than a clock displayed to a user of the electronic device 104 and further may be substantially inaccessible to a user of the disconnected device 104. A drift rate of the device clock 120 may also be known and stored by the disconnected device 104.

In further embodiments, the device clock 120 may generate an index, referred to herein as a clock index. In one embodiment, the clock index is a number that changes whenever the device clock 120 is reset, such as when the disconnected device 104 experiences a power interruption or reboot. In one embodiment, the clock index is an integer representing the number of times that the device clock 120 has been reset. In other embodiments, the clock index may be the output of a function that changes upon reset of the device clock 120.

The device ID 122 may include a static identifier that uniquely identifies a disconnected device 104. The device ID 122 may also be queryable, allowing a disconnected device 104 to share the device ID 122 to provide an identification of itself.

The license enforcement component 114 may be stored in the memory of, and executed by a processing unit of, the disconnected electronic device 104. In one embodiment, the license enforcement component 114 is configured to respond to requests for information from the digital content service 102 regarding the disconnected electronic device 104 in which it is executed. The license enforcement component 114 is further configured to receive time based access restrictions and time calibration information, such as time calibration values and clock index values, from the digital content service 102. In one embodiment, the time calibration information may be tailored to a specific disconnected device 104. In alternative embodiments, the time calibration information may be specific to a group of common disconnected devices 104, for example, a specific model of disconnected device 104. As discussed below, the license enforcement component 114 employs the time access restrictions and the time calibration information specific to the disconnected electronic device 104 in which it is executed to permit or deny access to digital content received by that disconnected electronic device 104.

In one embodiment, the license enforcement component 114 communicates with the digital content service 102 via a portable data transfer device 106 in order to generate the time calibration information specific to its disconnected electronic device 104, as well as to provide digital content. The portable data transfer device 106 may include portable data storage media capable of being written to and read. In the discussion below, the portable data transfer device 106 may be referred to in the context of universal serial bus (USB) memory devices. It may be understood, however, that USB devices represent one illustration of the portable data transfer device 106. Other examples of the portable data transfer device 106 may include, but are not limited to, flash memory cards, magnetic media, and optical media, such as rewriteable CDs and DVDs.

The portable data transfer device 106 may be directly connected to the disconnected electronic device 104 or connected to another device that is in communication with the disconnected electronic device 104 in order to transfer information between disconnected device 104 and the portable data transfer device 106. Upon receipt of information from the disconnected electronic device 104, the portable data transfer device 106 may communicate the information to the digital content service 102 via one or more network access points 118 and a network 112. In one embodiment, the network access point 118 may include a computing device in communication with the network 112 and capable of receiving data from the portable data transfer device 106. In further embodiments, one or more of the operations described herein as being performed by the digital content service 102 may be performed by a combination of the digital content service and the network access point 118 or, alternatively, by the network access point 118 alone. Examples of the network access point 118 may include, but are not limited to, personal computers, mobile phones, terminals, electronic book readers, laptop computers, digital media players, set top boxes, video game players, or personal digital assistants.

In one embodiment, the network 112 is the Internet. It may be understood, however, that the network 112 may be a local area network (LAN), wide area networks (WAN), a personal area network (PAN), landline telephone network, cellular telephone network, cable network, and/or any combination thereof. Embodiments of the network 112 may be further implemented through wired or wireless transmission mechanisms. Because protocols for network communications, such as TCP/IP are well known to those skilled in the art of computer networks, further description of these protocols and other methods used to implement the network are not provided herein.

The operating environment 100 depicted in FIG. 1 is illustrated as a distributed computing environment including several computer systems that are interconnected using one or more computer networks. However, it will be appreciated by those skilled in the art that the operating environment 100 could have fewer or greater components than are illustrated in FIG. 1. For example, the operating environment 100 could include various web services components and/or peer-to-peer network configurations. Thus, the depiction of the operating environment in FIG. 1 should be taken as illustrative and not limiting to the present disclosure.

Now that the license enforcement component 114 has been described, the digital content service 102 will now be described in more detail. The digital content service 102 may be implemented by a single computing device, such as a server. However, those skilled in the art will appreciate that the digital content service 102 may be embodied in a plurality of servers, each executing an instance of the digital content service 102. The server may include a network interface, memory, processing unit, and computer readable medium drive, all of which may communicate with one another by way of a communication bus. The network interface may provide connectivity to the network 112 and/or other networks or computing systems. The processing unit may communicate to and from memory, which contains computer program instructions that the processing unit executes in order to operate the digital content service 102. The memory generally includes RAM or ROM and/or other persistent and auxiliary memory. For example, in one embodiment, the memory may include a user interface component 128 that generates user interfaces and/or instructions therefore, such as those illustrated in FIGS. 3A-3C, for display. In one embodiment, the user interface component 128 may be displayed upon the network access point 118.

In one embodiment, the digital content service 102 may include a time calibration component 124 and the user interface component 128. The digital content service 102 may further be in communication with one or more data stores 126 that contain digital content. The time calibration component 124 is configured to generate time calibration values for the disconnected electronic devices 104. In one example, the time calibration component 124 may communicate with a reference time keeping device, such as network time resource 110 maintained within the network 112, or alternatively by the digital content service 102 itself, to obtain a reference time. The time keeping device may be implemented in hardware, software, firmware, or a combination thereof. In another example, the time calibration component 124 may further issue requests to the disconnected electronic devices 104 during the time calibration process to provide device information, including, but not limited to, the device time measured according to the device clock 120, the device ID 122, and the clock index. This device information allows the time calibration component 124 to determine correction factors that, when summed, provide the time calibration value. These correction factors may include a device time correction, a synchronization time correction, and a drift correction.

In one embodiment, for example, the device time correction represents an adjustment that facilitates an approximate synchronization of the time measured by the disconnected electronic device 104 with the network time resource 110. The device time correction is specific to a particular disconnected electronic device 104 because, after distribution from the manufacturer, each disconnected electronic device 104 is likely to experience different events (e.g., power interruptions, reboot) at different times that change the time measurements provided by the device clock 120 with respect to time measurements provided by the network time resource 110. The device time correction may be calculated by taking the difference between the reference time and the device time (Equation 1):

$$\text{Device Time Correction} = \text{Reference Time} - \text{Device Time} \quad (1)$$

In another embodiment, the correction factors include the synchronization time correction, a correction that accounts for the fact that the device time and the reference time are not measured at about the same moment in time, with respect to the reference time keeping device. Rather, the reference time is measured, then the device time is measured at a later time, and then the device time is reported to the digital content service 102 at an even later time, referred to herein as the reconnection time. The synchronization time correction may be given by the difference between the reference time and the reconnection time (Equation 2):

$$\text{Synchronization Time Correction} = \text{Reference Time} - \text{Reconnection Time} \quad (2)$$

The synchronization time correction is specific to a particular disconnected electronic device 104, and even specific to a particular calibration process, as it depends upon how long the user takes to record the reference time, obtain the device time, and return the device time to the digital content service 102.

It may be noted that the synchronization time correction represents an overestimation of the time taken to obtain the device time, as the synchronization time correction is calculated using the reconnection time, which occurs later than the time at which the device time is measured, with respect to the reference time keeping device. By including the synchronization time correction in the time calibration value, the time calibration value overestimates the time difference between the reference time keeping device and the disconnected electronic device, resulting in a modified device time that is ahead of the time measured according to the reference timekeeping device. Thus, in one embodiment, when the time based access restrictions are enforced using the modified device time as a substitute for the reference time keeping device, access to digital content expires in advance of the actual reference time specified by the access restrictions, substantially ensuring that the restrictions are not violated by the disconnected electronic device 104.

In a further embodiment, the correction factors include the clock drift correction. The clock drift correction accounts for the fact that the error in measurement of the device time varies with time. In certain embodiments, the drift rate may be mathematically approximated from empirical data. In further embodiments, the drift rate may be taken to be approximately constant. In other embodiments, the drift rate may be selected or measured by a manufacturer of the disconnected electronic devices 104. The clock drift correction may be calculated by multiplying the drift rate by the time elapsed from the last calibration of the disconnected electronic device 104 (Equation 3):

$$\text{Clock Drift Correction} = \text{Drift Rate} * \text{Time Since Last Calibration} \quad (3)$$

The clock drift correction is specific to a particular instance of the calibration process as it depends on the time since last calibration.

The calculated device time correction and synchronization time correction, along with the device ID 122, the clock index, the time/date of the calibration (referred to herein as a synchronization time), and a synchronization ID that identifies the specific calibration performed, may be stored for later use by the time calibration component 124. In one embodiment, the digital content service 102 may store these data in an electronic device data store 130A in communication with the digital content service 102.

In an alternative embodiment, the time calibration component 124 may obtain one or more correction factors from the manufacturer of the disconnected electronic device 104. For example, the manufacturer may measure a manufacturer time correction during manufacture of the disconnected electronic device. Notably, as the manufacturer may have direct access to the device clock 120 of the disconnected electronic device 104, the device time correction may be measured directly, without the need for the synchronized time correction. Thus, the time calibration value may be determined from the manufacturer time correction measurement and the drift correction. The manufacturer may further assign a manufacturer clock index that corresponds to the manufacturer time correction.

In further embodiments, the manufacturer may store the manufacturer time correction, manufacturer clock index, and/or the drift corrections associated with one or more disconnected electronic device 104 in a location that may be accessed by the digital content service 102. For example, the manufacturer may operate a manufacturer service 132 in communication with the network 112 that provides access to a manufacturer data store 130B containing the manufacturer time correction.

The digital content service 102 may be further configured to respond to requests for digital content from a user. The digital content may include, but is not limited to text, audio, video, and software applications, such as video games. In certain embodiments, the digital content may be distributed for rental. The digital content may further include one or more time based access restrictions. In one embodiment, the access restrictions may include permission to use the digital content only within a selected window of time from when the digital content is provided by the digital content service 102 (e.g., 30 days). In another embodiment, the access restrictions may include permission to use the digital content only within a selected window of time from first use, for example, 24 hours from when the digital content is first played. In a further embodiment, the access restrictions may include permission to use the digital content only before a selected date. Those skilled in the art will appreciate that other access restrictions may be provided without departing from the scope of the present disclosure. Thus, the foregoing examples should not be construed as limiting.

In the illustrated embodiment of FIG. 1, the digital content is stored within a data store 126 in communication with the digital content service 102. For example, this data store may be in direct communication with the digital content service 102. Alternatively, this data store may be accessed by the digital content service through the network 112. The digital content may be communicated to the digital content service 102 and subsequently transmitted to the network access point 118 for conveyance to the disconnected electronic device 104 via the portable data transfer device 106.

In one aspect, users may interact with the digital content service 102 via user interfaces generated by the user interface component 128. For example, the digital content service 102 may enable a user to create a user account that distinguishes the user during access of the digital content service 102. Such a distinguishable, or registered, user may further designate one or more disconnected electronic devices 104 that they wish to be associated with a user account. For example, the device ID 122 of a disconnected electronic device 104 may be provided when the user, employing their user account, performs a time calibration for that disconnected electronic device 104. Thus, by identifying a user account and a device ID 122, the user's disconnected electronic devices 104 may be identified.

Once the time calibration component 124 has identified the user and their electronic devices 104, the user may also employ the digital content service 102 to browse and request digital content accessible by the digital content service 102. Upon receiving a registered user's request for digital content, the digital content service 102 may transfer digital content information to the network access point 118. The digital content information may include, inter alia, the requested digital content itself, time based access restrictions associated with the requested digital content, and the time calibration information for the specific disconnected electronic devices 104 associated with the user making the request. Subsequently, the portable data transfer device 106 may be employed to transfer the digital content information to the disconnected electronic device 104 for playback.

FIGS. 2A through 2E are block diagrams of embodiments of the operation of the digital content service 102 and the license enforcement component 114 within the operating environment 100 shown in FIG. 1. FIGS. 2A through 2E will be further described in conjunction with FIGS. 3A and 3C, which illustrates embodiments of user interfaces generated by the user interface component 128 for display to the user during the time calibration process.

Figure 3A:
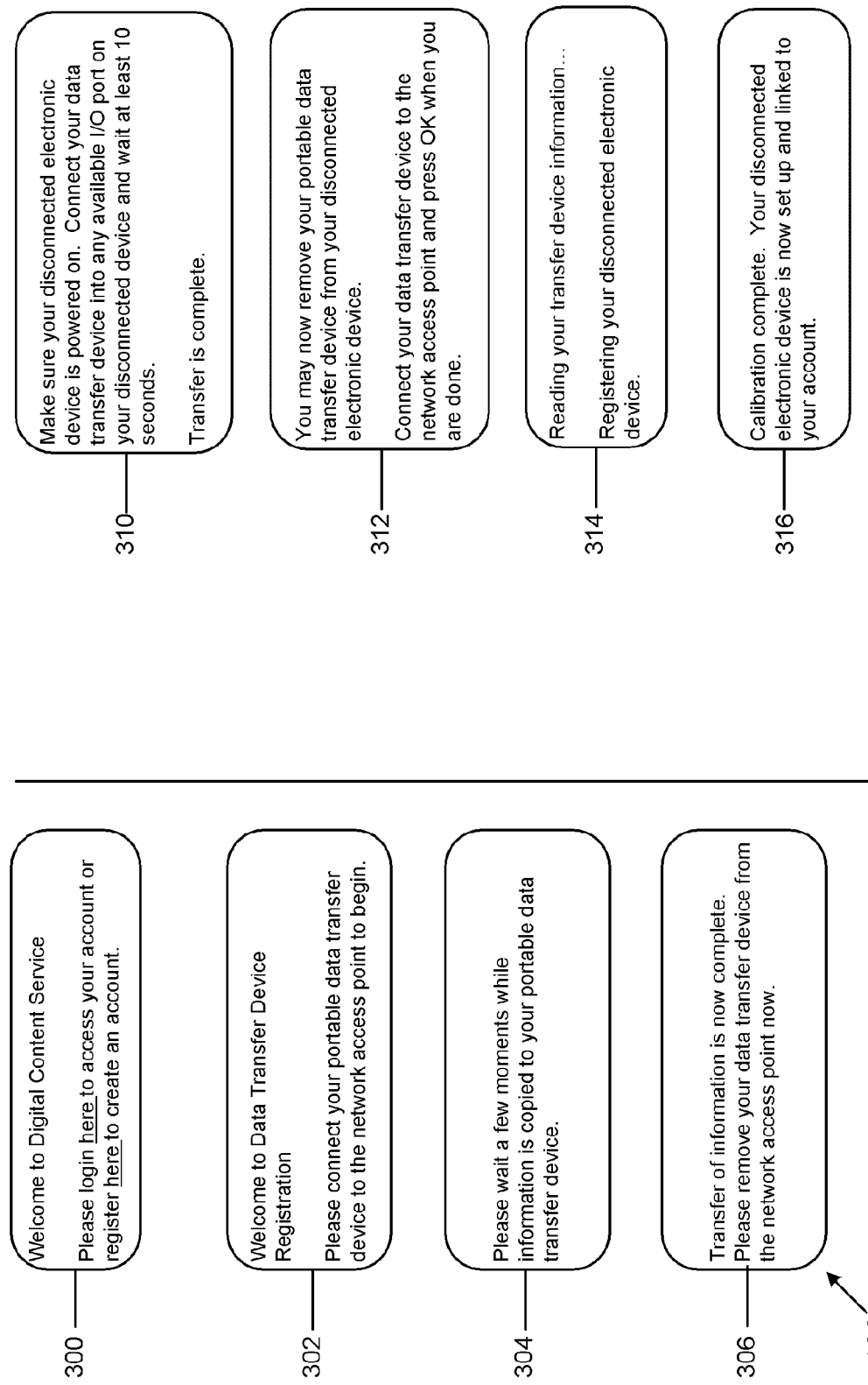

As shown in FIG. 3A, the user is welcomed to the digital content service 102 and prompted to login or create an account in user interface 300. By using a personalized account, the digital content service 102 may identify the disconnected devices 104 calibrated by the user, allowing the user to recall any previously generated time calibration values and avoid the need to repeat the calibration process, unless a disconnected device 104 has not yet been calibrated or the calibration is found to be invalid.

In user interface 302, the user is prompted to connect his or her portable data transfer device 106 to the network access point 118 to begin the calibration process. Upon connection of the portable data transfer device 106 to the network access point 118, a user request (FIG. 2A) to initiate the time calibration process is sent to the digital content service 102 from the network access point 118. In response to receipt of the user request, the time calibration component 124 of the digital content service 102 acquires the reference time from the network time resource 110 and generates the synchronization ID and date for the ongoing time calibration process. The time calibration component 124 further generates a registration request that instructs the disconnected electronic device 104 to provide information for the digital content service 102.

This information is then transferred for storage and communication with the disconnected device 104. In one embodiment, the reference time and synchronization ID and date are transferred to the data store 130A for storage. In another embodiment, the synchronization ID and registration request are transferred to the portable data transfer device 106 via the network access point 118.

As the digital content service 102 acquires the reference time, generates the synchronization ID, etc., a user interface 304 may be displayed that informs the user to wait while the reference time, synchronization ID and registration request are copied to their portable data transfer device 106. When these actions are complete, the user is prompted in user interface 306 to remove the portable data transfer device 106 from the network access point 118 and connect the portable data transfer device 104 to the disconnected electronic device 104 in user interface 310.

Figure 2B:
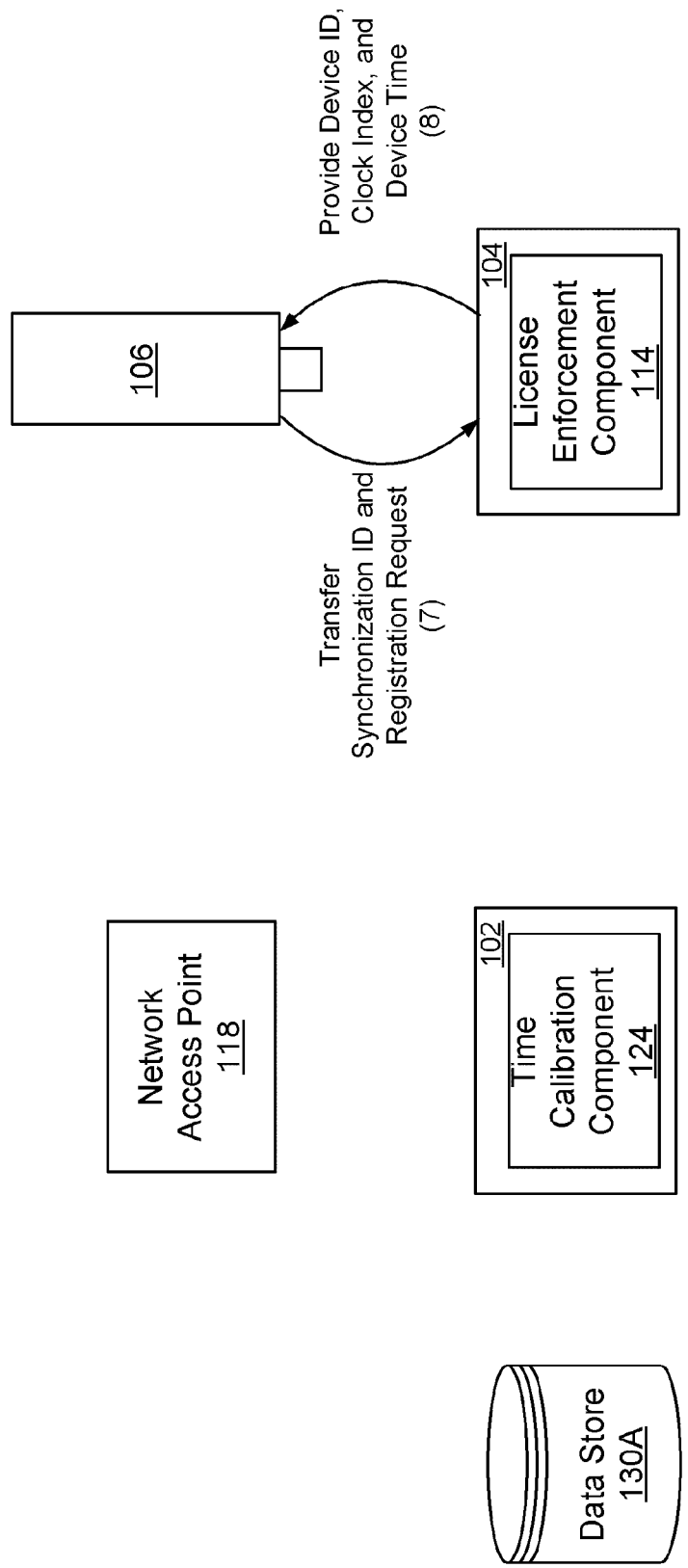

As shown in FIG. 2B, upon connection of the portable data transfer device 106 to the disconnected electronic device 104, the license enforcement component 114 of the disconnected electronic device obtains the registration request, and transmits the requested information about the disconnected device 104 to the portable data transfer device 106. In one embodiment, the information requested of the disconnected electronic device 104, referred to herein as disconnected device information, may include, but is not limited to, the device ID 122, the current time measured by the device clock 120, also referred to as the device time, the clock index, and the drift rate of the disconnected electronic device 104.

Figure 2C:
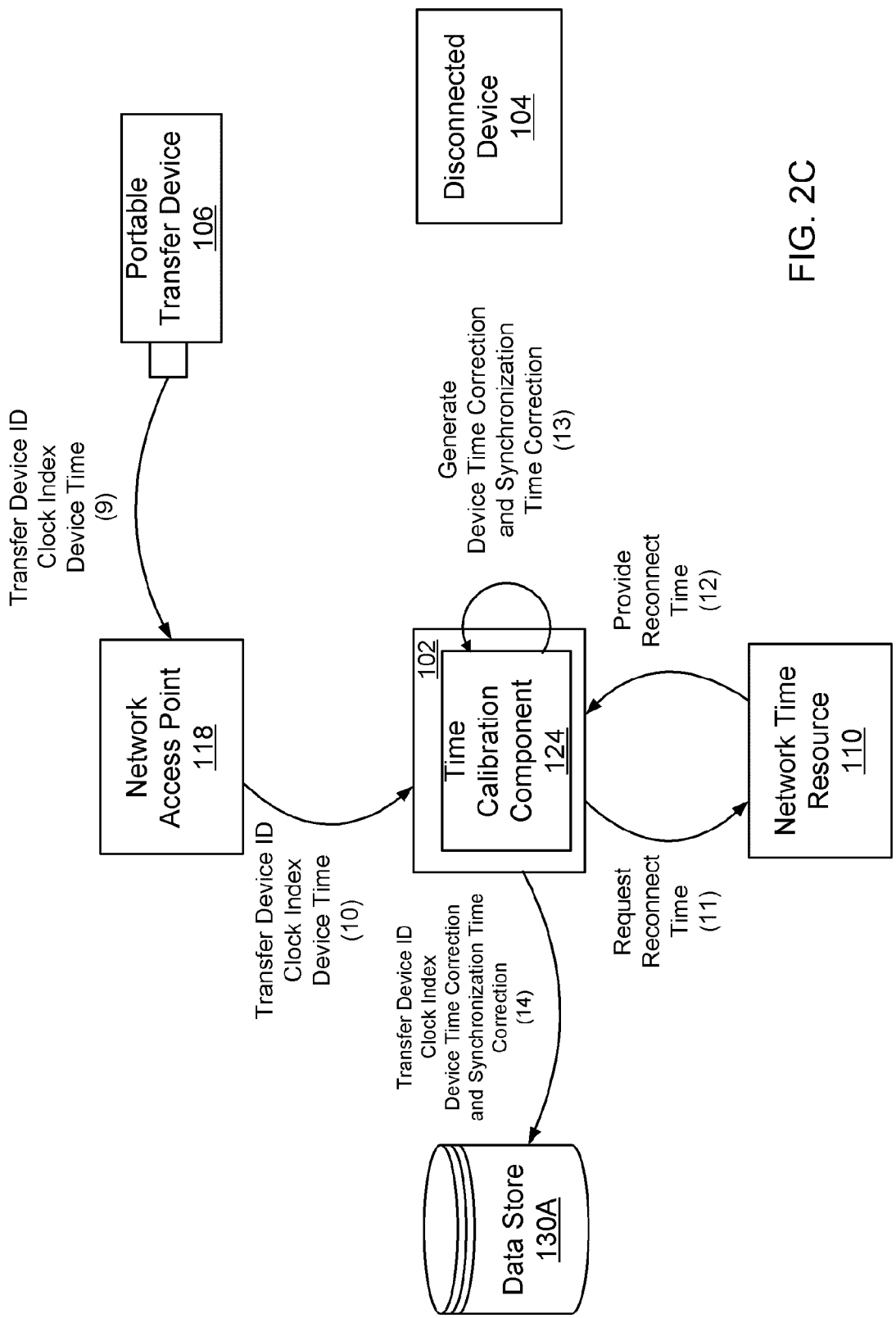

It will also be appreciated that following disconnection of the portable data transfer device 106 from the network access point 118, the user may be prompted in user interface 312 to re-insert the portable data transfer device 106 in the network access point 118 so that the requested information about the disconnected device 104 may be retrieved from the portable data transfer device 106 and transferred to the time calibration component 124 of the digital content service 102 via the network access point 118 as shown in FIG. 2C. Accordingly, upon detection by the digital content service 102 that the portable data transfer device 106 has been returned to the network access point 118, the disconnected device information (e.g., device ID, clock index, device time, and drift rate) is transferred to the digital content service 102, which in turn, stores the information in the electronic device data store 130A. In one embodiment, the user may also be prompted to input information to the network access point 118 to assist the digital content service 102 in detecting that the portable data transfer device 106 has been returned. In addition, a corresponding user interface 314 may be displayed to confirm that the information stored on the portable data transfer device 106 is being transferred.

At about the same time that the disconnected device information is being transferred to and stored by the digital content service 102, the time calibration component 124 of the digital content service 102 may also acquire and record the time of receipt of the registration data (i.e., the reconnection time) from the network time resource 110. With the reference time, device time, and reconnection time, the device time correction and synchronization time correction may be calculated by the time calibration component 124 of the digital content service 102 in accordance with Equations 1 and 2 as set forth above. These calculated values may also written to the electronic data store 130A and correlated with the device ID 122 and synchronization ID of the disconnected electronic device 104 for future use.

The user may then be informed, in an illustrative user interface 316, that the calibration process is complete. The user interface 128 may further indicate that the user may now proceed to transfer digital content to their portable data transfer device 106 for use with their disconnected electronic device 104.

Figure 2D:
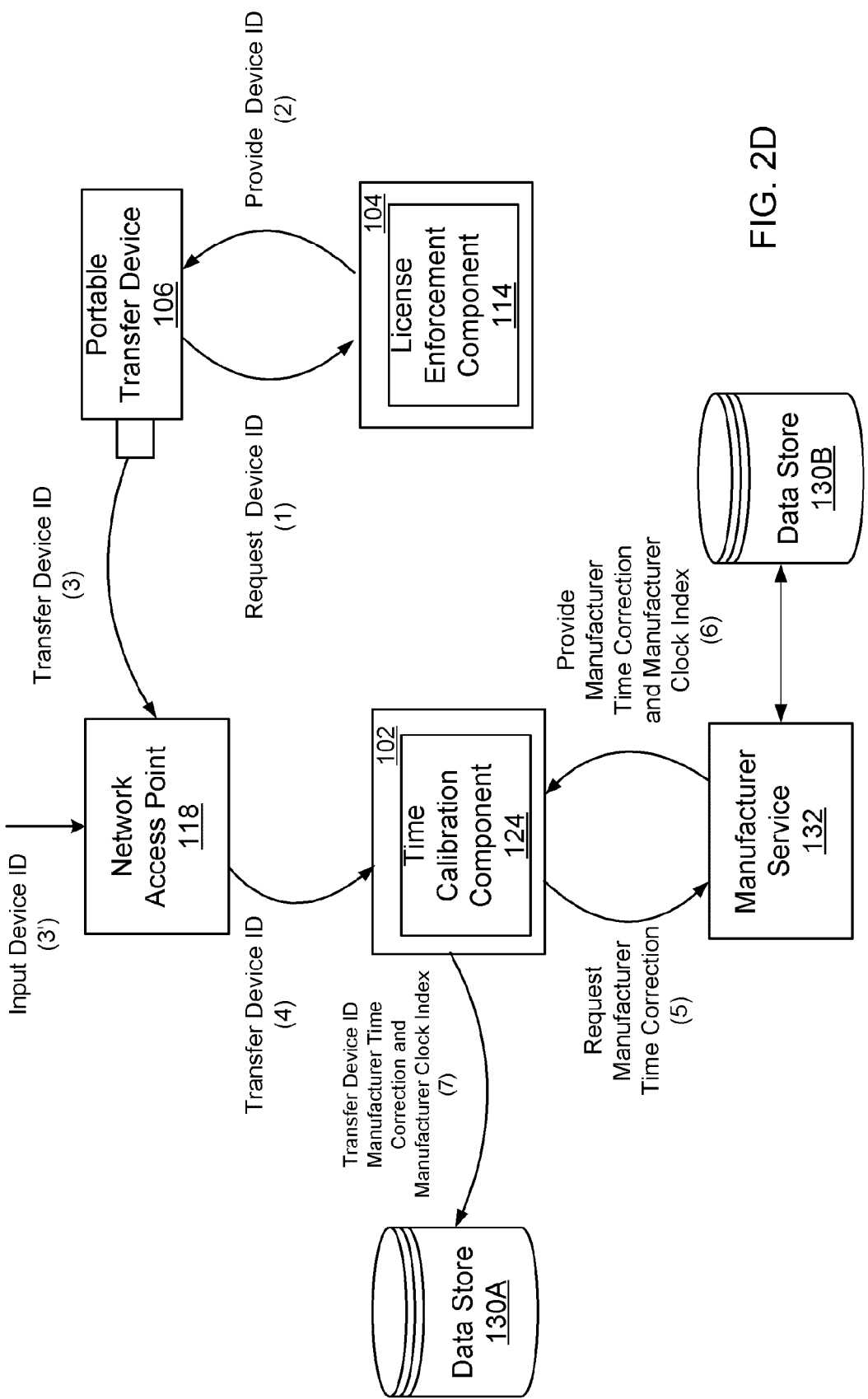

In an alternative embodiment, FIG. 2D, the digital content service 102 may obtain the device time correction from a network resource, instead of through the calibration process discussed above. This process is referred to herein as the manufacturer calibration process. In one embodiment, the network resource may include data store 130B. In further embodiments, the network resource may be maintained by a manufacturer of the disconnected electronic device, such as a manufacturer service 132. The device time correction so obtained is referred to herein as a manufacturer time correction.

Figure 3B:
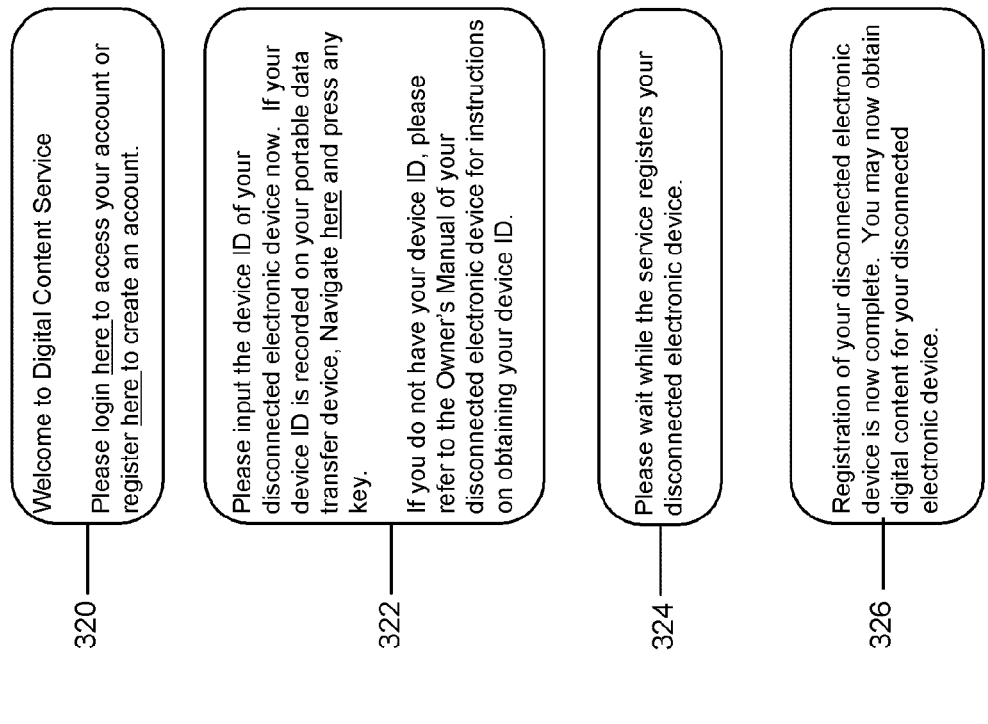

As illustrated in FIGS. 2D and 3B, the user may identify themselves to the digital content service 102 in user interface 320. In response to a request to register a disconnected electronic device, the digital content service 102 may prompt the user, via user interface 322, to provide the device ID 122 for the disconnected device 104 to the time calibration component 124.

In one embodiment, the user may enter the device ID manually. For example, the device ID 122 may be obtained from a record provided with a purchased disconnected electronic device 104, such as a piece of paper packaged with the disconnected electronic device 104. In another example, the device ID 122 may be displayed for recordation by the user in response to commands input by the user through a user interface of the disconnected electronic device 104.

In another embodiment, the user may employ the portable data transfer device 106 to transfer the device ID 122 from the disconnected device 104. For example, the user may connect the portable data transfer device 106 to the disconnected device 104 and instruct the disconnected device 104 to transfer the device ID to the portable data transfer device 106, such as through the user interface of the disconnected device 104. Subsequently, the portable data storage device 106 may be connected to the network access point 118 for transfer of the device ID 122 to the time calibration component 124.

Upon receipt of the device ID 122 by the time calibration component 124, user interface 324 may instruct the user to wait for the digital content service 102 to register the disconnected electronic device 104. In one embodiment, the time calibration component 124 may send a request for the manufacturer time correction to data store 130B, either directly or via the manufacturer service 132. This manufacturer time correction request may include transmission of the device ID 122 so as to identify the disconnected electronic device 104.

In response to the manufacturer time correction request, the data store 130B may return the manufacturer time correction, and an associated manufacturer clock index, to the time calibration component 124 of the digital content service 102. The manufacturer clock index represents a clock index for the disconnected electronic device 104 that is set by the manufacturer upon fabrication and may be employed in the same manner as the clock index obtained from the disconnected electronic device 104. In further embodiments, the data store 130B may return the drift time of the disconnected electronic device 104. Upon successful return of the manufacturer time correction to the time calibration component 124, the manufacturer time correction, manufacturer clock index, and drift rate may be transferred to the data store 130A. The illustrative user interface 330 may further inform the user that the disconnected electronic device 104 is now registered for use.

Figure 2E:
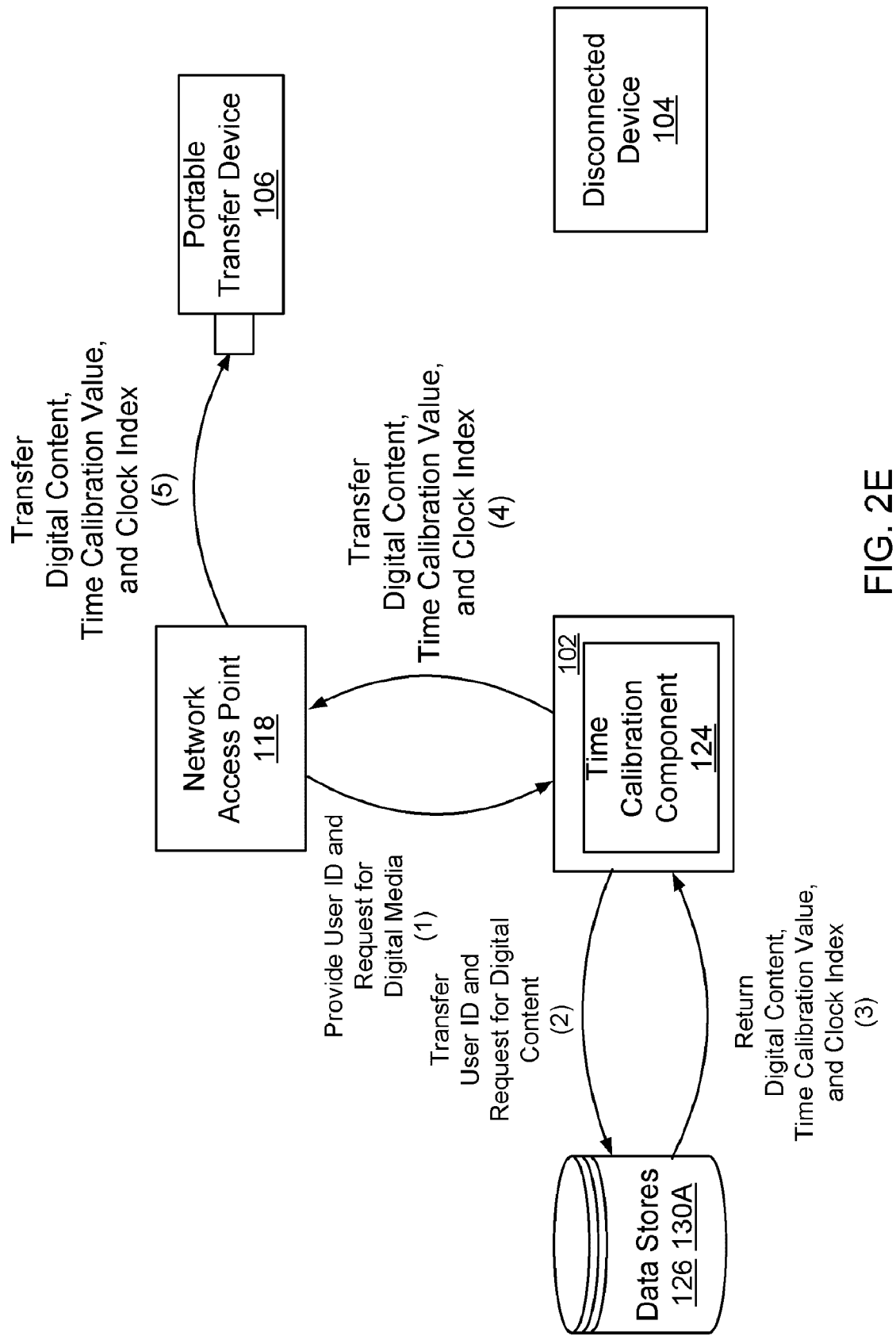

As shown in FIG. 2E, once the calibration process is performed, the user may proceed to obtain digital content from the digital content service 102 for use on one or more disconnected electronic device 104. The user may employ a user interface 330 to identify his or herself to the time calibration component 102. Once identified, the user may further employ a user interface 332 that allows the user to browse and select from the digital content maintained by the digital content service 102. For example, a list of digital content purchased by the user may be displayed to the user for retrieval.

Once a digital content selection has been made, the user identification and the request for digital content are transmitted to the time calibration component 124, which gathers the digital content and calibration information (e.g. time calibration value, clock index, synchronization date) specific to the disconnected devices associated with the user from data stores 126, 130A. In user interfaces 334 and 336, the user may be prompted to connect their portable data transfer device 106 to the network access point 118 and wait in order to transfer the digital content and calibration information to the portable data transfer device 106. Once the transfer is complete, user interface 340 may instruct the user to remove their portable data transfer device from the network access point 118 and connect it to their disconnected electronic device 104 for playback.

Figure 4:
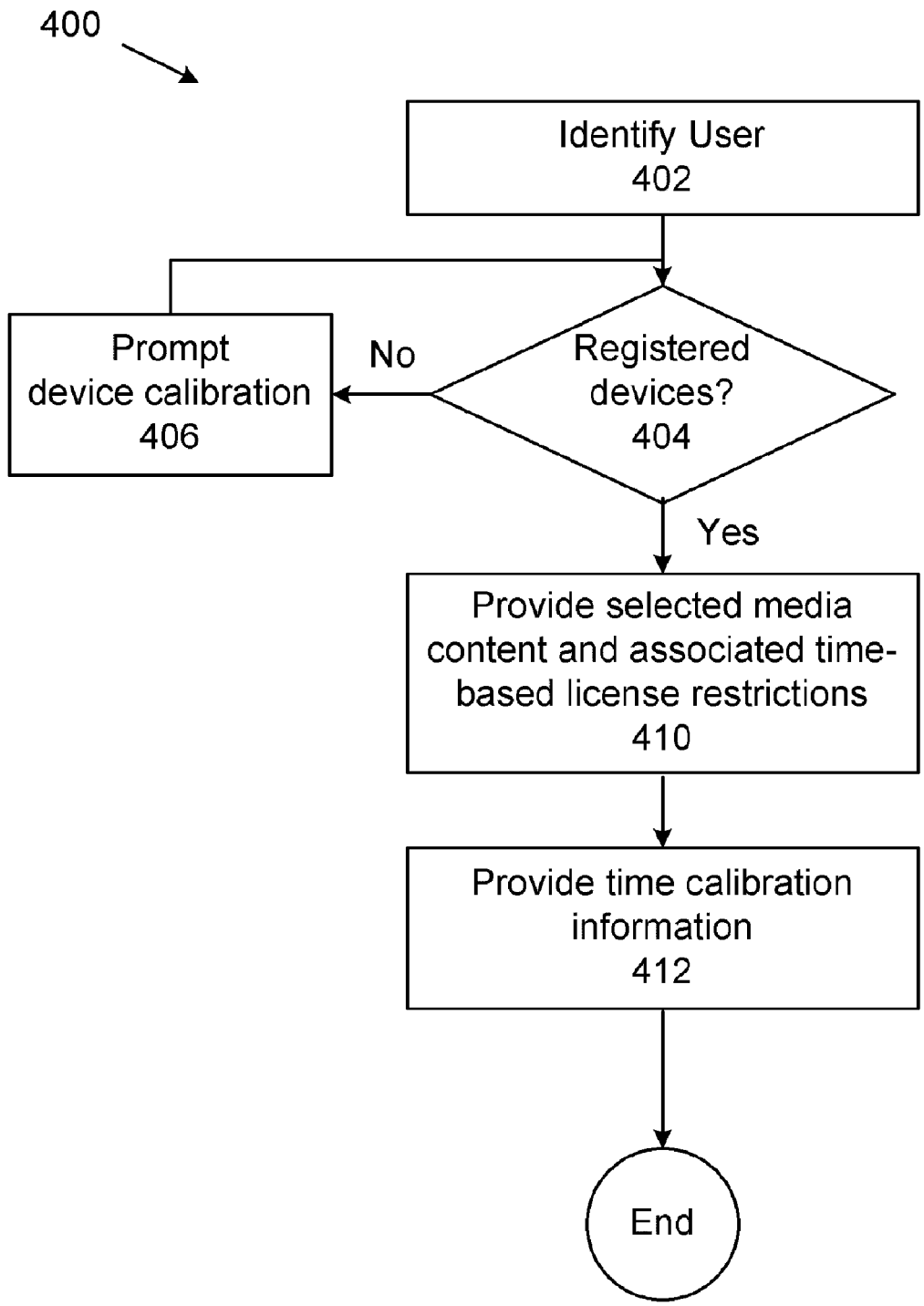
FIG. 4 is a flowchart depicting illustrative operation of the digital content service during distribution of digital media content to a portable data transfer device.

FIG. 4 is a flow diagram 400 depicting an illustrative process implemented by the digital content service 102 to provide digital content to calibrated, disconnected electronic devices 104. In block 402, the digital content service 102 identifies the user, such as through validation of a username and password provided by the user, via a user interface, as discussed above. In decision block 404, upon identifying the user, the digital content service 102 determines whether the user has registered, and thus calibrated, any disconnected electronic devices 104 for use with the digital content service 102. If not, the digital content service 102 prompts the user, via the user interface, to perform the calibration process. Once calibration and registration are complete, the digital content service 102 provides the digital content that has been selected by the user and its associated time based restrictions in block 406. In one embodiment, the digital content service 102 retrieves the digital content selected by the user, and its associated time based restrictions from the digital content data store 126, and transfers it to the portable data transfer device 106 via the network access point 118. In another embodiment, the digital content and associated time based restrictions are already stored on the disconnected electronic device 104, and thus, need not be provided by the digital content service 102.

Next, in block 410, the digital content service 102 also provides the portable data transfer device 106 with the time calibration information for the disconnected electronic devices 104 via the network 112. Accordingly, the user may be prompted to remove the portable data transfer device 106 from the network access point 118 and connect the portable data transfer device 106 to the disconnected electronic device 104 for purposes of calibrating the disconnected electronic device 104.

Figure 5:
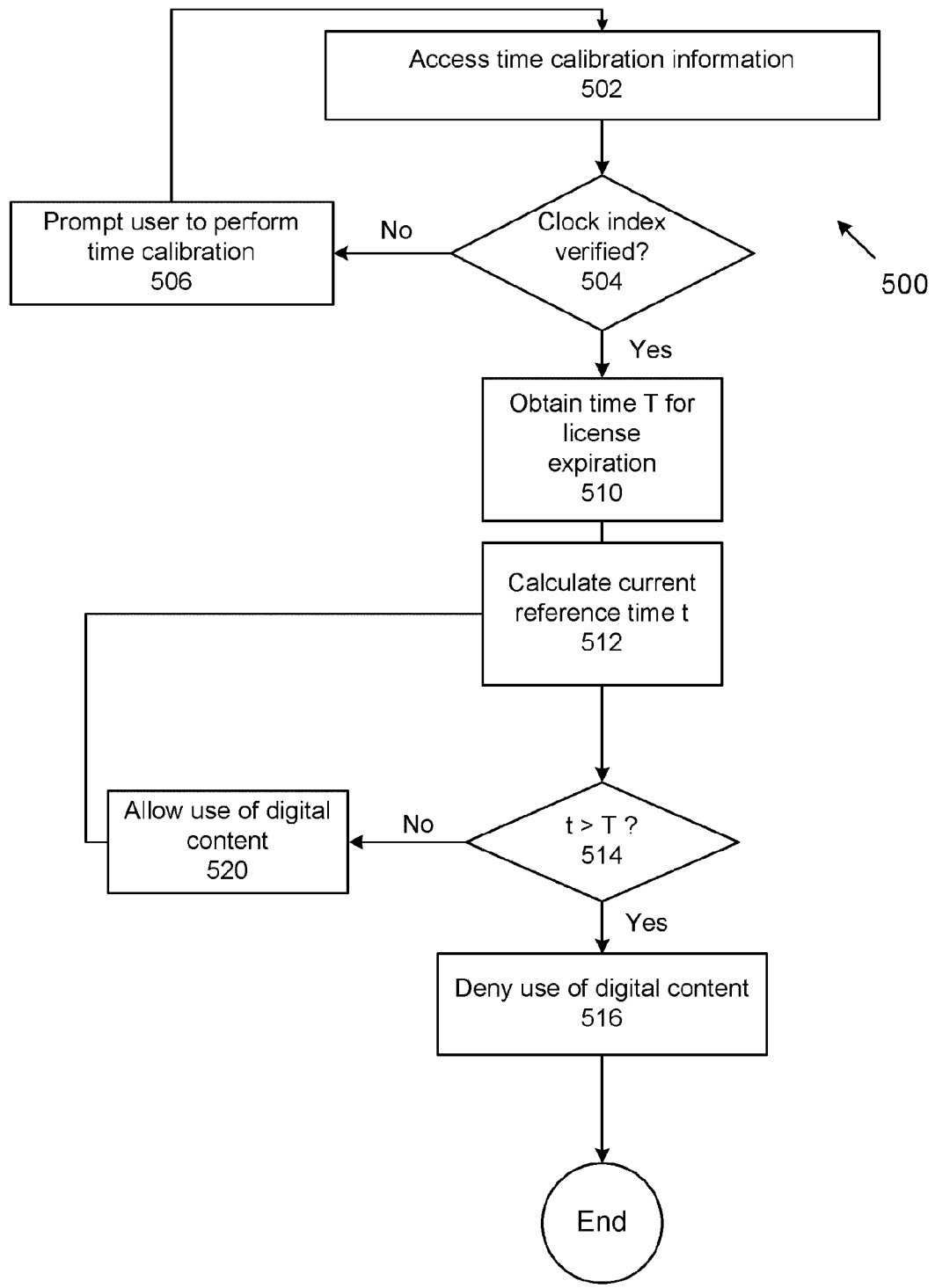
FIG. 5 is a flowchart depicting illustrative operation of the disconnected electronic device upon receipt of digital media content from the digital content service via the portable data transfer device.

FIG. 5 is a flow diagram 500 depicting an illustrative disconnected electronic device 104 during playback of digital content. In block 502, the license enforcement component 114 accesses the time calibration information from the reconnected portable data transfer device 106 in communication with the disconnected electronic device 104. In one embodiment, the clock index provided with the time calibration information may be compared with the clock index of the disconnected electronic device 104 for verification in a decision block 504. In the event that the two indices do not match, the license enforcement component 114, prompts the user to perform the device calibration process in block 506, such as via the user interface of the disconnected electronic device 104.

If the clock index is verified in decision block 504, the process proceeds to blocks 510-520, where the license enforcement component 114 examines the time based access restrictions associated with the digital content to determine whether the disconnected electronic device 104 is permitted to use the digital content. In one embodiment, the license enforcement component 114 obtains a time period during which access to the digital content is permitted, T, with respect to the network time resource 110, in block 510. In block 512, the license enforcement component 114 further obtains the current device time from the device clock 120 and the time calibration information and converts the current device time into an approximate current time, t, as measured with respect to the network time resource 110. If t is determined to be outside the time period T in decision block 514, then the license enforcement component 114 denies the disconnected electronic device 104 permission to use the received digital content in Block 516. Alternatively, if t is determined to be within the time period T in decision block 514, then the license enforcement component 114 permits the disconnected electronic device 104 to use the received digital content in block 520.

Provided that t is within T, the process repeats the blocks 512-516, as discussed above, and allows playback the digital content. As time continues to advance during this process, there will eventually come a time at which t is not within T, and the process moves to block 516 denying playback of the digital content.

It may be understood that, in alternative embodiments, the time calibration information may also be used to convert times measured with respect to the reference time keeping device into times measured with respect to the device clock 120. For example, the time period T may be converted into a time period T' with respect to the device clock 120 and the time t may remain unchanged for purposes of making a comparison as to whether t is within T' in decision block 514.

In further embodiments, the access restrictions may be updated, as necessary. For example, assume that the access restrictions include a selected time period that begins upon first use of the digital content and a user wishes to employ the digital content on more than one disconnected electronic device 104. If first use occurs in block 520, the process may move to decision block 522 to determine whether use of the digital content is stopped after first playback is initiated. If no stop in the use of the digital content is detected, the process moves to block 512 and continues as discussed above. If a stop in use of the digital content is detected, the process moves to block 524, where an updated time T' for license expiration, with respect to the reference time keeping device is calculated and provided to the portable data storage device 106. The user may then transfer the portable data storage device 106 to another disconnected electronic device 106 to continue playback and the process resumes at block 502, where the process now employs time T' in block 510.

In one embodiment, public key encryption methods may also be used to preserve the privacy of communications between the disconnected electronic devices 104 and the digital content service 102. Beneficially, such encryption decreases the likelihood that third parties may intercept and modify the information exchanged between the disconnected electronic devices 104 and the digital content service 102 and circumvent the time based access restrictions intended to be in force when using of the digital content.

Public key (PK) methods require that the two parties, such as the disconnected electronic devices 104 and the digital content service 102, each have a key pair, where one of the keys is designated public and the other private. Messages encrypted with the public key of a key pair are decrypted using the corresponding private key, and vice versa. The private key cannot be determined from its corresponding public key, so the public key may be freely distributed in the clear to any party who wishes to send an encrypted message to its owner.

Once public keys have been exchanged between the two parties, each can pass messages securely to the other by first encrypting the message with the recipient's public key. The message's encrypted bits may be accessible to any reader, while in transit but it is rendered unintelligible by the encryption scheme. PK methods also reveal whether or not the content has been changed in any way during transit.

In the systems and methods described here, however, communication are established before a key exchange can take place, thus such handshake messages are initially sent in the clear or unencrypted. Unencrypted messages may altered, particularly if sent in human readable form as files on the portable data transfer device 106, such as XML files. Furthermore, of the two parties, the digital content service 102 has access to third party resources that might be used to independently verify the identity of the disconnected electronic device 104. The disconnected electronic device 104 itself has no immediate mechanism to confirm that message purporting to be from the digital content service 102 was in fact authored and sent by the digital content service 102.

To address this issue, a first authentication message may be sent from the digital content service 102 to the disconnected electronic device 104 via the portable data transfer device 106. Upon receipt of this first message by disconnected electronic device 104, the license enforcement component 114 detects and replies to the first authentication message. In one embodiment, the disconnected electronic device 104 authors a reply including a second authentication message, which is also written to the portable data transfer device 106. When the portable data transfer device 106 is subsequently reconnected to the digital content service 102, the time calibration component 124, user interface component 128, or another component of the digital content service 102 reads the second authentication message from the disconnected electronic device 104.

Because the digital content service 102 does not know the public key of the disconnected electronic device 104 device at the start of the authentication session, the first authentication is written in the clear. In order to maintain the integrity of the exchange, several risks are of concern:

Man-in-the-Middle attacks, where the authentication messages are altered in transit in either direction, and then passed on.

Device spoofing, in which a message purporting to be from either the disconnected electronic device 104 or the digital content service 102 is actually authored by a malicious user for the purpose of misleading the recipient into either revealing a secret, or gaining unauthorized access to protected assets.

Replay attacks, in which a legitimate message is recorded and replayed at either a later date, or sent to a different recipient than the one for which it was intended.

In one embodiment, two cryptographic methods can be used in tandem to address the first two risks. The first, applying a digital signature to the authentication messages, enables the recipient to confirm, using the sender's public key, that the message has not been changed after having been signed using the sender's private key. The challenge response technique can be used to verify the identity of an authentication message sender, when the recipient has access to an independent source of the correct response to the challenge. A challenge including a random sequence of characters, used only once, can be sent to the disconnected electronic device 104, that should respond with a message that proves it is in possession of the appropriate private key. Using the two techniques together, the recipient of an authentication message could confirm the message sender is legitimate by having provided the correct response to the challenge, and the rest of message has not been altered in any way in transit.

These authentication messages enable the disconnected electronic device 104 to convey to the digital content service 102 its own public key for future messaging sessions. The response from the disconnected electronic device 104 could also include a challenge from the disconnected electronic device 104 to the digital content service 102. The correct response to disconnected electronic device 104 challenge could be based on the disconnected electronic device's 104 private key, which the disconnected electronic device 104 may reliably presume could only have been written by a legitimate service to have access to the private keys of its disconnected electronic devices 104.

The next message of the digital content service 102 to the disconnected electronic device 104 could include a reply, encrypted using the disconnected electronic device's 104 public key that includes the correct response to the disconnected electronic device's 104 challenge. At that point, both the digital content service 102 and the disconnected electronic device 104 can be assured that they have authenticated each other's identity, and can communicate using standard PK methods.

The third risk, that of replay attacks, can be addressed by establishing a communication protocol that requires responses to include a Request ID which uniquely identifies each request issued by the Request's sender. For example, if the digital content service 102 issues a request to reply with the current time on the disconnected electronic device's 104 device clock 120, a user could attempt to reply to the request by replacing the supplied response file with one containing the response from the previous day. If, however, the message contains both the response from the disconnected electronic device's 104, along with corresponding Request ID supplied by the digital content service 102, the digital content service 102 could determine that the supplied response is actually a replay rather than a response to the request it just issued.

EXAMPLE

The following non-limiting example presents an illustration of how embodiments of the time based content management system of the present disclosure may be employed to determine whether digital content is permitted to be used by disconnected devices 104. The example illustrates how the time based content management system can accommodate the use of digital content with one or more disconnected electronic devices 104, as well as the seamless manner in which an expiration date may be determined when the disconnected electronic devices 104 do not measure time with respect to a common reference time keeping device are employed. It may be understood that this example is provided for illustrative purposes and should not be construed to limit the scope of the disclosed embodiments.

Assume that it is about 12:00:00 PM, on Jun. 30, 2008 and the user had begun playback of a movie at about 11:40 AM that same day on an electronic device with a connection to the network time resource 110, such as a personal computer. Assuming a 24 hour period is permitted by the time based access restrictions, the time of expiration of the digital content is about 11:40 AM on Jul. 1, 2008, with respect to time measured according to the network time resource 110. If the user transfers the movie to their portable data transfer device 106 for playback on a disconnected electronic device 104, such as a stand-alone DVD player, at what time, according to the internal clock of the DVD player, should playback be disabled?

The license enforcement component 114 of the disconnected electronic device 104 may determine the answer to this question by employing the time calibration information stored by the portable data transfer device 106. An example of such time calibration information is illustrated in Table I.

TABLE I

Sample data for expiration date calculation

| Device ID | Clock Index | Device Time Correction (dd:hh:mm:ss) | Synchronization Time Correction (dd:hh:mm:ss | Synchronization ID | Synchronization Date |
|---|---|---|---|---|---|
| XBrand123 | 10242 | −00:03:10:10 | 00:00:7:05 | AQ3J15ZX22A1 | 3/1/2008 18:00 |

Assuming that the data in Table I for the disconnected electronic device 104 is valid, the expiration date calculation may be performed as follows, in any order.

In one embodiment, the device time correction may be applied to a known expiration date in the frame of reference of the network time resource 110 to obtain a first expiration date (Expiration date 1) for the digital content. Expiration date 1 represents the expiration date after the device time correction has been applied. The calibration information of Table I indicates that the device time correction is −00:03:10:10 with respect to the network resource time, the expiration date is modified with respect to the device time by subtracting this amount of time to the expiration date in the frame of reference of the network time resource 110.

$$\text{Expiration date } 1 = 11:40:00 \ 7/1/2008 - (-00:03:10:10)$$
$$= 14:50:10 \ 7/1/2008$$

In another embodiment, the synchronization time correction may be applied to Expiration date 1, as Expiration date 1 is accurate to within the about the Synch Time Correction, 00:00:07:05. Thus, the synch time correction is subtracted from Expiration date 1 to yield Expiration date 2:

$$\text{Expiration date } 2 = 14:50:10 \ 7/1/2008 - (00:00:07:05)$$
$$= 14:43:05 \ 7/1/2008$$

In a further embodiment, assuming that the drift rate of the disconnected electronic device 104 is known, the drift correction may be calculated from the date of last calibration (synchronization date). In one aspect, the drift rate may be obtained from the disconnected device 104. In another aspect, the drift rate may be included in the time calibration information of Table I. Assuming, for example, that the drift rate is 2 seconds per day and the last calibration, as shown in Table I, was performed on Mar. 1, 2008 at 18:00:00, as measured with respect to the reference time keeping device. As shown in Table I, 123 days will have passed from the date of calibration to the present date, Jul. 1, 2008. The drift correction at worst, is equal in magnitude to the drift rate multiplied by the number of days which have passed from the date of calibration, i.e., 2 seconds/day×123 days=00:00:04:06. Subtracting the drift correction from the Expiration date 2 yields Expiration date 3:

$$\text{Expiration date } 3 = 14:43:05 \ 7/1/2008 - (00:00:04:06)$$
$$= 14:38:59 \ 7/1/2008$$

Using all three of the correction factors in the calculation of Expiration date 3 provides a conservative estimate of the expiration date that substantially ensures that the conditions of the rental license of the digital content are not violated.

In summary, systems and methods for rights management of digital content used with electronic devices 104 lacking a connection to a common reference time keeping device are provided. A time calibration process is developed for disconnected electronic devices 104 that employs a digital content service 102 in communication with a reference time keeping device, such as network time resource 110. The calibration process allows the calculation of time calibration values that, when applied to a device time measured by disconnected electronic devices 104, provides the devices 104 with modified device times that are approximately equal to that of a reference time keeping device. The time calibration value and other time calibration information for the plurality of disconnected electronic devices 104 may be stored by the digital content service 102 and written to portable data transfer device 106 for use by the disconnected electronic devices 104. The calibration process may further employ verification protocols to inhibit invalid time calibration values from being used to circumvent the time based access restrictions placed upon the digital content. In this manner, digital content may be consumed by a user on a plurality of disconnected electronic devices 104 without violating license agreements associated with the digital content.

Embodiments of the present disclosure have been described with reference to the drawings. As will be recognized, many of the features embodied within the disclosed systems and methods may be implemented or used without others. Numerous implementation details have been set forth in the description in order to illustrate, but not limit, the disclosure.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Alternative implementations are included within the scope of the embodiments described herein which elements or functions which may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for synchronizing an electronic device, the system comprising:
a data store that stores time calibration values for one or more electronic devices, wherein each time calibration value is usable by its respective electronic device to synchronize its measurement of time with a reference time keeping device;

a computing device in communication with the data store and the reference time keeping device, the computing device operative to:

measure at least one time calibration value using measurements of time from the reference time keeping device and the electronic device, receive a user request for digital content; and retrieve the requested digital content, the digital content having time based access restrictions measured with respect to the reference time keeping device; and a portable data transfer device configured for communication with the computing device and the electronic devices so as to transfer the requested digital content and the time calibration values from the computing device to the electronic devices, wherein the portable data transfer device does not include a time keeping device.

2. The system of claim 1, further operative to determine the time calibration value associated with the electronic device from the user request.

3. The system of claim 1, wherein the digital content comprises at least one of text, audio, video, and software applications.

4. The system of claim 1, wherein computing device measures the at least one time calibration value by measuring:

a first reference time with respect to the reference time keeping device;

a device time with respect to the electronic device after measurement of the first reference time; and a second reference with respect to the reference time keeping device after measurement of the device time.

5. The system of claim 4, wherein the time calibration values comprise a sum of:

a difference between the first reference time measurement and the device time measurement; and a difference between the first reference time measurement and the second reference time measurement.

6. A computer implemented method for facilitating time based access restrictions on digital content, the computer implemented method comprising:

receiving a request for digital content having time based access restrictions determined with respect to a reference time keeping device;

identifying one or more electronic devices, wherein the electronic devices are not in communication with the reference time keeping device;

retrieving a time calibration value for at least one of the electronic devices, wherein the electronic device is capable of using its time calibration value for synchronization with the reference time keeping device; and transmitting the requested digital content and time calibration values to a portable data transfer device configured to transfer the digital content and time calibration values to the electronic device.

7. The computer implemented method of claim 6, wherein the digital content comprises at least one of text, audio, video, and software applications.

8. The computer implemented method of claim 6, wherein the time based access restrictions comprise at least one time range during which access to the digital content by a selected electronic device is denied.

9. The computer implemented method of claim 6, wherein the request for digital content further identifies the electronic device for which the time calibration is to be retrieved.

10. The computer implemented method of claim 6, wherein the time calibration value comprises a function of:

a first reference time measured with respect to the reference time keeping device, a device time measured with respect to the electronic device after measurement of the first reference time, and a second reference time measured with respect to the reference time keeping device after measurement of the device time.

11. The computer implemented method of claim 10, wherein the time calibration values comprise a sum of:

a difference between a first reference time and the device time; and a difference between the first reference time and the second reference time.

12. The computer implemented method of claim 6, further comprising:

transferring the requested digital content and time calibration values for the at least one electronic device from the portable data transfer device to the electronic device; and synchronizing the at least one electronic device with the reference time keeping device using the time calibration value for the at least one electronic device when an attempt to access at least a portion of the transmitted digital content is made.

13. The computer implemented method of claim 12, further comprising permitting access to the portion of the transmitted digital content if the synchronized device time is within a time period specified by access restrictions associated with the transmitted digital content.

14. The computer implemented method of claim 12, further comprising verifying the transmitted time calibration value associated with the selected electronic device and denying access to the transmitted digital content if the verification fails.

15. The computer implemented method of claim 14, wherein verifying the transmitted time calibration value comprises comparing a first authentication value associated with the time calibration value and a second authentication value maintained by the electronic device.

16. The computer implemented method of claim 15, wherein the verification fails if the first and second authentication values are not equal.

17. The computer implemented method of claim 6, wherein the time calibration value comprises a device time correction measured by a manufacturer of the electronic device.

18. The computer implemented method of claim 6, wherein the time calibration value is retrieved from a data store maintained by a manufacturer of the electronic device.

19. A system for implementing time based access restrictions for digital content, comprising:

a data store that stores time calibration values for electronic devices, wherein each time calibration value is usable by its respective electronic device to synchronize its measurement of time with a reference time keeping device, wherein the electronic devices do not communicate with the reference time keeping device; and a computing device in communication with the data store that is operative to:

obtain the time calibration value associated with the electronic device; obtain digital content selected for use with the electronic device, the digital content having time based access restrictions measured with respect to the reference time keeping device; and provide the electronic device with the selected digital content and the time calibration values via a portable data transfer device.

20. The system of claim 19, wherein the time calibration value for a selected electronic device comprises a device time correction that is approximately equal to a difference between a first time measured by the reference time keeping device and a second time measured by the selected electronic device.

21. The system of claim 20, wherein the time calibration value for the selected device further comprises a synchronization time correction that is approximately equal to a difference between the first time and a third time at which the second time is recorded, the third time measured with respect to the reference time keeping device.

22. The system of claim 21, wherein the time calibration value for the selected device further comprises a drift time correction that is approximately equal to the product of a drift rate and the duration of time elapsed from measurement of the first time and the calculation of the drift time.

23. The system of claim 19, wherein the electronic devices comprise digital media players.

24. The system of claim 19, further comprising a data store that is in communication with the computing device that stores the digital content.

25. The system of claim 20, wherein the time calibration value comprises a device time correction measured by a manufacturer of the electronic device.

26. The system of claim 20, wherein the time calibration value is retrieved from a data service maintained by a manufacturer of the electronic device.

* * * * *